(12) United States Patent
Xie et al.

(10) Patent No.: US 12,259,863 B2
(45) Date of Patent: Mar. 25, 2025

(54) RETRIEVAL APPARATUS, METHODS, AND STORAGE MEDIUM

(71) Applicant: ZILLIZ INC., Redwood City, CA (US)

(72) Inventors: Chao Xie, Redwood City, CA (US); Weizhi Xu, Shanghai (CN); Songlin Wu, Shanghai (CN); Mengzhao Wang, Shanghai (CN); Xiaomeng Yi, Shanghai (CN)

(73) Assignee: Zilliz Inc., Redwood City, CA (US)

( * ) Notice: Subject to any disclaimer, the term of this patent is extended or adjusted under 35 U.S.C. 154(b) by 0 days.

(21) Appl. No.: 18/192,027

(22) Filed: Mar. 29, 2023

(65) Prior Publication Data

US 2024/0330260 A1 Oct. 3, 2024

(51) Int. Cl.
| | | |
|---|---|---|
| G06F 16/00 | (2019.01) | |
| G06F 16/22 | (2019.01) | |
| G06F 16/2458 | (2019.01) | |

(52) U.S. Cl.
CPC .......... *G06F 16/22* (2019.01); *G06F 16/2462* (2019.01)

(58) Field of Classification Search
None
See application file for complete search history.

(56) References Cited

U.S. PATENT DOCUMENTS

| | | | | |
|---|---|---|---|---|
| 7,702,640 B1 * | 4/2010 | Vermeulen | .......... | G06F 16/2246 707/999.1 |
| 9,158,847 B1 * | 10/2015 | Majumdar | ............... | G06N 3/02 |
| 9,171,031 B2 * | 10/2015 | Dhuse | ................. | G06F 16/2228 |
| 10,185,772 B2 * | 1/2019 | Yi | ......................... | G06F 16/9535 |
| 2006/0064424 A1 * | 3/2006 | Heuer | ..................... | H03M 7/30 |
| 2007/0276802 A1 * | 11/2007 | Piedmonte | ........ | G06F 16/24542 |

(Continued)

FOREIGN PATENT DOCUMENTS

| | | | | |
|---|---|---|---|---|
| CN | 111400314 A | | 7/2020 | |
| CN | 111699482 A | * | 9/2020 | ......... G06F 16/2365 |

(Continued)

OTHER PUBLICATIONS

The pq-gram distance between ordered labeled trees (Year: 2008).*
Approximate Matching of Hierarchical Data Using pq-Grams (Year: 2006).*

*Primary Examiner* — Jean M Corrielus
(74) *Attorney, Agent, or Firm* — Kim IP Law Group LLC

(57) ABSTRACT

A retrieval apparatus, a method, and a storage medium are disclosed. The retrieval apparatus includes a memory and a processor, wherein the processor is configured to acquire a retrieval request, and the retrieval request includes the query vector; according to the query vector, generate and execute a first access request corresponding to the first memory according to the first graph index and the index node in the candidate pool; determine and process the data acquired by the first access request corresponding to the first memory, corresponding to the absence of redundant data in the previous storage pool, and store the result in the result pool; and output the data in the result pool corresponding to the candidate pool does not include unreachable index nodes. The retrieval apparatus improves the efficiency of the data reading process and further improves the efficiency of the retrieval process.

19 Claims, 11 Drawing Sheets

(56) References Cited

U.S. PATENT DOCUMENTS

| | | | |
|---|---|---|---|
| 2010/0223421 A1* | 9/2010 | Kim | G06F 12/0246 |
| | | | 711/E12.001 |
| 2013/0232306 A1* | 9/2013 | Dhuse | G06F 16/2228 |
| | | | 711/154 |
| 2018/0225313 A1* | 8/2018 | Coburn | G06F 16/22 |
| 2020/0372047 A1* | 11/2020 | Wu | G06F 16/5854 |
| 2021/0334242 A1* | 10/2021 | Potharaju | G06F 16/182 |
| 2022/0237188 A1* | 7/2022 | Su | G06F 16/2228 |
| 2023/0409889 A1* | 12/2023 | Haykal | G06N 3/063 |

FOREIGN PATENT DOCUMENTS

| | | | | | |
|---|---|---|---|---|---|
| CN | 113326389 | A | * | 8/2021 | |
| CN | 113609313 | A | * | 11/2021 | |
| CN | 114117111 | A | | 3/2022 | |
| CN | 115129949 | A | * | 9/2022 | |
| CN | 111444368 | B | * | 1/2023 | G06F 16/58 |

* cited by examiner

The neighbor index node ID

RETRIEVAL APPARATUS, METHODS, AND STORAGE MEDIUM

TECHNICAL FIELD

The disclosure relates in general to the field of retrieving technologies, and more particularly, to a retrieval apparatus, method, and storage medium.

BACKGROUND

With the arrival of the era of big data, the memory capacity of existing electronic devices has been unable to meet the needs to store a large amount of raw data, as well as indexes established on the basis of the raw data, to facilitate retrieval and query of data. Thus, external memory devices, such as Solid-state Drive (SSD), which are relatively inexpensive, are often used as devices for additional data storage.

In the vector graph index algorithm based on solid state hard disk (SSD, the operating system reads one page (page) of data of 4 KB size each time it accesses the solid state disk, and one page of data corresponds to one partition of data of dividing all the original vectors. Therefore, the page of data read will include the data of one retrieval node required in the retrieval process and several index nodes with ID numbers adjacent to the ID number of the retrieval node. Since the several index nodes with ID numbers adjacent to the ID number of the retrieval node are probably not neighbor index nodes recorded in the adjacency table of the retrieval node, it is likely that data other than the retrieval node in each read of the data obtained from the solid-state disk, is redundant, resulting in a large amount of data waste.

SUMMARY

The disclosure provides a retrieval apparatus, a method, and a storage medium. By re-dividing the graph index of the original vectors, the index nodes corresponding to the original vectors and their neighbor index nodes thereof are stored in the same partition, that is, in the same page of a solid state disk, so that each time data on the solid state disk is read, data of the index nodes and data of their neighbor index nodes thereof can be read simultaneously, thereby improving efficiency of the data reading process; At the same time, in the retrieval process, the unprocessed data in the data obtained from the last access can be processed synchronously while waiting for the data to be obtained from the solid state disk, and the efficiency of the retrieval process is further improved.

One or more embodiments may include an apparatus having a memory including a first memory for storing a first graph index and original vectors, and a second memory for storing the PQ compressed vectors of the original vectors; and a processor configured to obtain the retrieval request including the query vector; according to the query vector, generate and execute the first access request corresponding to the first memory corresponding to the first graph index and an index node in the candidate pool, wherein the candidate pool is used to store a retrieval node in the current retrieval, the retrieval node is the index node corresponding to the original vector that needs to obtain vector data from the first memory, the first graph index is a graph index including all the index nodes and their neighbor relationships, and each index node corresponds to one of the original vectors; determine and process the data acquired by the first access request corresponding to the first memory in response to the absence of redundant data in the previous storage pool, and store the results in a result pool, wherein the redundant data includes data of the index node not used acquired from the first memory; and output the data in the result pool corresponding to the candidate pool does not include unreachable index nodes.

It shall be understood that when retrieving the retrieval nodes in the candidate pool, the retrieval apparatus may obtain the data corresponding to the retrieval nodes in the candidate pool through the first graph index, and process the data corresponding to the retrieval nodes in the candidate pool when the previous storage pool does not include redundant data.

One or more embodiments may include an apparatus, the index nodes in the candidate pool are arranged in order from near to far according to the PQ distances from the query vector, and wherein: according to the query vector, generate and execute a first access request corresponding to the first memory corresponding to the first graph index and index nodes in the candidate pool comprises: corresponding to the first m unreachable index nodes in the candidate pool, generating and executing a first access request corresponding to the first memory according to the query vector, wherein m is a natural number greater than or equal to 1.

It shall be understood that the number of index nodes in the candidate pool may be multiple, and therefore selecting the first m unreachable index nodes in the candidate pool for retrieval, can improve the overall efficiency of the retrieval process and avoid unnecessary retrieval procedures.

One or more embodiments may include an apparatus, wherein determine and process the data acquired by the first access request corresponding to the first memory in response to the absence of redundant data in the previous storage pool, and store the results in a result pool comprises: obtaining data of the original vector corresponding to the first m unreachable index nodes and its adjacency table from the first memory; and calculating the Euclidean distances between the original vectors corresponding to the first m unreachable index nodes and the query vector separately, and storing the calculation results and the corresponding index nodes in a result pool based on the vector data of the original vectors corresponding to the first m unreachable index nodes.

It shall be understood that the original vector with greater similarity to the query vector may be queried by calculating the Euclidean distances between the original vectors corresponding to the first m unreachable index nodes and the query vector, respectively, or the original vector with greater similarity to the query vector may be queried by calculating the cosine similarity distances, for example.

One or more embodiments may include an apparatus, wherein determine and process the data acquired by the first access request corresponding to the first memory in response to the absence of redundant data in the previous storage pool, and store the results in a result pool, further comprising: generating and executing a second access request corresponding to the second memory according to the query vector corresponding to an index node in an adjacent table of the first m unreachable index nodes; and calculating the PQ distances between the original vectors corresponding to the index nodes in a contiguous table of the first m unreachable index nodes and the query vector separately, based on the data obtained by the second access request corresponding to the second memory, and storing the calculation results and the corresponding index node in the candidate pool.

It shall be understood that according to the PQ compressed vector of the original vectors corresponding to the index nodes in the adjacency table of the first m unreachable index nodes, the PQ distances between the original vectors and the query vector can be obtained. Because the time to access memory is shorter than the time to access the solid state disk, these index nodes can be preliminarily sorted according to the distances between them and the query vector by the calculation of the PQ distances. And after store the calculation results and the corresponding index nodes in the candidate pool, the index nodes can be used in the next calculation of the index nodes of the candidate pool based on Euclidean distances.

One or more embodiments may include an apparatus, wherein determine and process the data acquired by the first access request corresponding to the first memory in response to the absence of redundant data in the previous storage pool, and store the results in a result pool, further comprising: storing redundant data in the data acquired by the first access request corresponding to the first memory in the previous storage pool.

It shall be understood that storing the redundant data obtained from the first memory, namely the solid-state hard disk, into the previous storage pool can be used for the next calculation of the PQ distances between the query vector and the original vectors corresponding index nodes in the previous storage pool.

One or more embodiments may include an apparatus, further comprising: processing the redundant data corresponding to the presence of the redundant data in the previous storage pool.

One or more embodiments may include an apparatus, wherein processing the redundant data corresponding to the presence of the redundant data in the previous storage pool comprises: generating and executing a third access request corresponding to the first memory based on the redundant data and the query vector corresponding to the index node in the previous storage pool; calculating the Euclidean distances between the original vectors corresponding to the index nodes in the previous storage pool and the query vector, according to the data obtained by the third access request corresponding to the first memory, and storing the results and the corresponding index nodes in the result pool; generating and executing a forth access request corresponding to the second memory according to the query vector, corresponding to the index nodes in the adjacent table of the index node in the previous storage pool; and calculating the PQ distances between the original vectors corresponding to the index nodes in the adjacent table of the index nodes in the previous storage pool and the query vector separately, based on the data obtained by the forth access request corresponding to the second memory, and storing the results and the corresponding index nodes in the candidate pool.

It shall be understood that if there is redundant data in the previous storage pool, it is possible to obtain the index nodes corresponding to the original vectors that may be more similar to the query vector in the redundant data by calculating the Euclidean distances between the original vectors corresponding to the index nodes in the redundant data and the query vector, or by calculating the PQ distances between the original vectors corresponding to the index nodes in the remaining adjacency tables and the query vector in the processing of redundant data.

One or more embodiments may include an apparatus, the method of obtaining the index nodes in the previous storage pool comprises: calculating the Euclidean distances between the original vectors corresponding to the index nodes in the previous storage pool and the query vector separately based on the redundant data; sorting the index nodes in the previous storage pool according to the Euclidean distances, and selecting the first n index nodes; calculating the PQ distances between the original vectors corresponding to the index nodes in the adjacent table of the first n index nodes and the query vector separately according to the PQ compression vectors of the original vectors; and storing the PQ distances and the corresponding index nodes in the previous storage pool.

It shall be understood that selecting the index nodes in the adjacent table of the first n index nodes in the previous storage pool can further improve the retrieval efficiency and avoid unnecessary calculation process.

One or more embodiments may include an apparatus, the first graph index is established by: initializing fragments; assigning the index nodes to the corresponding fragments according to the access frequency of the neighbor index node, and synthesizing all fragments into a first graph index.

One or more embodiments may include an apparatus, wherein the method of obtaining index nodes in the candidate pool comprises: selecting a plurality of index nodes from all index nodes in the first graph index as a training set; performing retrieval training according to the training set and the first graph index, and recording access times of all the index nodes; selecting p index nodes according to the number of visits, and storing the p index nodes into a memory, wherein the p index nodes are p index nodes with the most number of visits, and p is a natural number greater than or equal to 1; establishing a memory navigation map; retrieving a plurality of index nodes corresponding to the original vectors whose distances are closest to the query vector according to the memory navigation map and the query vector; and storing the index nodes into the candidate pool.

It shall be understood that selecting hotspot index nodes to the candidate pool can further improve the retrieval speed.

One or more embodiments may include an apparatus, where the reading speed of the second memory is greater than that of the second memory.

One or more embodiments may include a method run by at least one processor, comprising: obtaining the retrieval request including the query vector; according to the query vector, generating and executing a first access request corresponding to a first memory corresponding to the first graph index and index nodes in the candidate pool, wherein the candidate pool is used to store a retrieval node in the current retrieval, the retrieval node is the index node corresponding to the original vector that needs to obtain vector data from the first memory, the first graph index is a graph index including all the index nodes and their neighbor relationships, and each index node corresponds to one of the original vectors; determining and processing the data acquired by the first access request corresponding to the first memory in response to the absence of redundant data in the previous storage pool, and storing the results in a result pool, wherein the redundant data includes data of the index node not used acquired from the first memory; and outputting the data in the result pool corresponding to the candidate pool does not include unreachable index nodes.

One or more embodiments may include a computer-readable storage medium having stored thereon the instructions that, when executed on an electronic device, cause the electronic device to perform a method comprising: obtaining the retrieval request including the query vector; according to the query vector, generating and executing a first access request corresponding to the first memory corresponding to the first graph index and an index node in the candidate pool, wherein the candidate pool is used to store a retrieval node in the current retrieval, the retrieval node is the index node corresponding to the original vector that needs to obtain vector data from the first memory, the first graph index is a graph index including all the index nodes and their neighbor relationships, and each index node corresponds to one of the original vectors; determining and processing the data acquired by the first access request corresponding to the first memory in response to the absence of redundant data in the previous storage pool, and storing the results in a result pool, wherein the redundant data includes data of the index node not used acquired from the first memory; and outputting the data in the result pool corresponding to the candidate pool does not include unreachable index nodes.

BRIEF DESCRIPTION OF THE DRAWINGS

In order that the technical solution in the embodiments of the disclosure may be explained more clearly, a brief description of the drawings required for use in the embodiments or the description of the prior art will be given below. Obviously, the drawings in the following description are merely some of the embodiments of the disclosure, and other drawings can be obtained from these drawings without involving any inventive effort to those skilled in the art.

DETAILED DESCRIPTION

The following will describe various aspects of the illustrative embodiment using terms commonly used by those skilled in the art.

It shall be understood illustrative embodiments of the disclosure include, but are not limited to, a retrieval apparatus, a method, and a storage medium.

In the following description, for purposes of illustration and not limitation, specific details, such as particular system structures, techniques, and the like, are set forth in order to provide a thorough understanding of embodiments of the disclosure. However, it will be apparent to those skilled in the art that the disclosure may be practiced in other embodiments without these specific details. In other instances, detailed descriptions of well-known systems, devices, circuits, and methods are omitted so as not to obscure the description of the disclosure with unnecessary detail.

The terminology used in the following examples is for the purpose of describing particular embodiments only and is not intended to limiting of the disclosure. As used in the specification and the appended claims, the singular expressions "a", "an", "the", "the", and "the" are also intended to include, for example, the expression "one or more" unless the context clearly dictates otherwise. It shall be understood in embodiments of the disclosure, "one or more" refers to one, two or more; and/or, describing the association relationship of the associated object, indicating that there may be three relationships; For example, A and/or B may represent the case where A is present alone, A and B are present at the same time, and B is present alone, wherein A, B may be singular or complex. The character "/" generally indicates that the associated object is an "or" relationship.

For case of understanding, some of the terms referred to in this disclosure are first explained below.

(1) Recall rate: The ratio of the amount of relevant data retrieved to the amount of all relevant data in the database, measured as the recall rate of the retrieval system.

(2) Adjacency list: A data structure consists the neighbors of each index node in the graph index. In other words, it gives information about how an index node is connected in the graph index.

Figure 1:
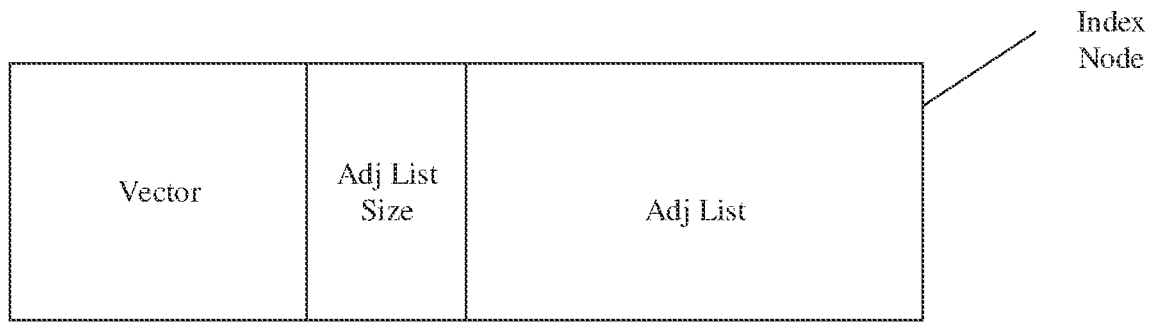
FIG. 1 illustrates a schematic structural diagram of an index node in a graph index.

In order to explain in detail a retrieval method in an embodiment of the disclosure, the retrieval process of the vector graph index algorithm based on solid state hard disk (SSD) in the embodiment of the disclosure will be explained firstly in combination with FIGS. 1, 2a and 2b.

Due to its high recall rate and low throughput, graph-based approximate nearest neighbor search algorithm has become a popular algorithm in the field of big data retrieval. Most graph-based approximate nearest neighbor search algorithms use some heuristic edge selection strategies to build a graph index based on all the original vectors. When performing the retrieval, it is necessary to store the graph index of the vector data including all the original vectors in the memory, which needs a large capacity of the internal storage. Therefore, in recent years, a vector graph index algorithm based on solid state hard disk (SSD) has been gradually proposed.

In the vector graph index algorithm based on SSD, the graph index including the vector data of the original vectors is stored on the SSD. The graph index includes all the index nodes. As shown in FIG. 1, each index node includes the vector data, the size of the adjacency table of the index node, and the adjacency table of the index node. Each index node in the graph index is assigned a unique identification number (ID). Through the graph partition technology, the graph index is divided into several partitions. The index nodes in each partition are arranged in order of the ID of the index nodes, and each partition is stored on a page of the SSD, which is the smallest read and write unit. The PQ compressed vector of all the original vectors is stored in the memory (that is, the compressed vector obtained by compressing the original vector through the product quantization (PQ) algorithm).

Figure 2A:
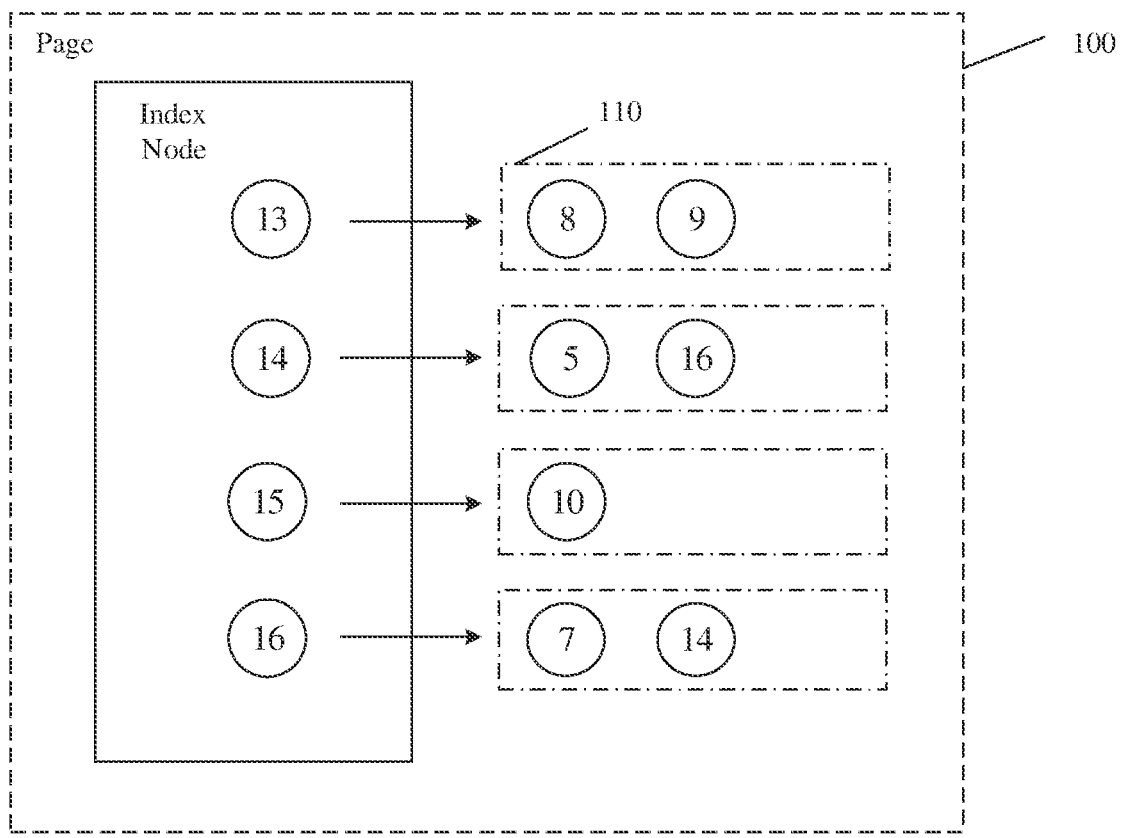
FIG. 2a illustrates a schematic structural diagram of a page on a solid state disk.

As shown in FIG. 2a, the page 100 on the SSD includes index node 13, index node 14, index node 15 and index node 16. For example, index node 13 includes the vector data of the original vector 13 represented by index node 13, the size of the adjacency table of index node 13, and the adjacency table of index node 13. The adjacency table of index node 13 includes the ID of index node 8 and index node 9. Index node 8 and index node 9 are neighbor index nodes of index node 13.

Figure 2B:
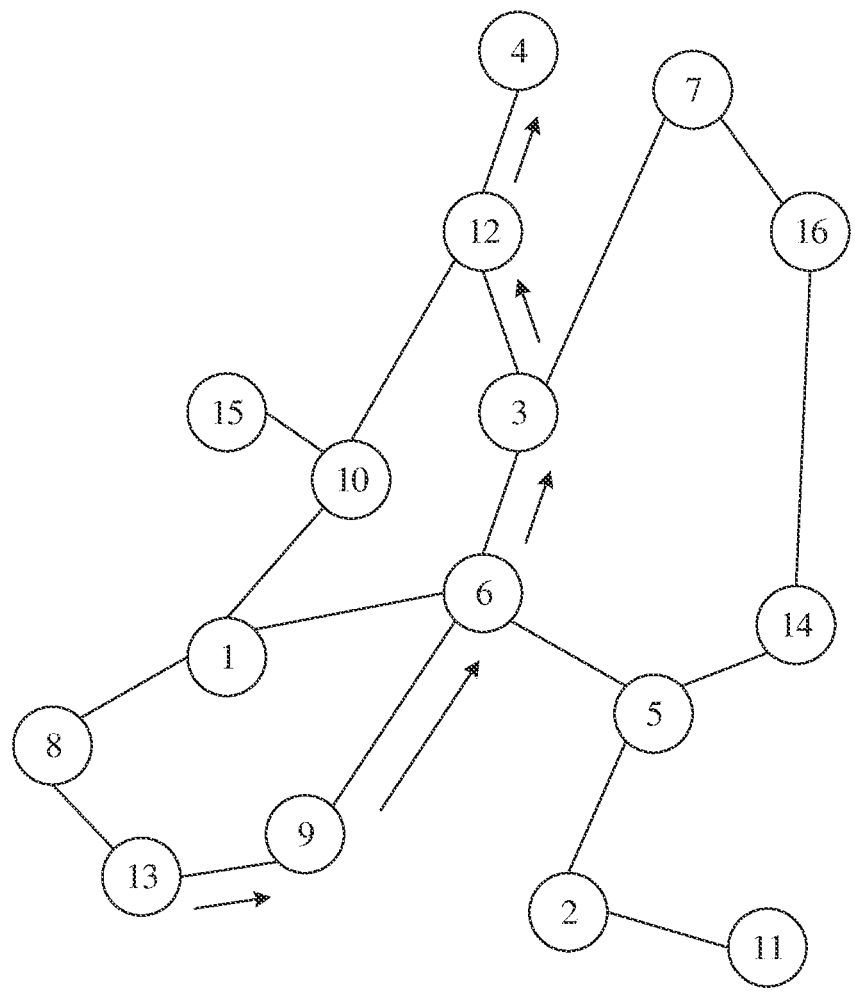
FIG. 2b illustrates a schematic diagram of a retrieval process of an approximate nearest neighbor retrieval algorithm based on a graph.

As shown in FIG. 2*b*, in the retrieval process for the query vector, the starting node 13 is stored in the candidate pool, which is used to store the starting node and other retrieval nodes in this retrieval. The retrieval nodes is the index nodes corresponding to the original vectors that needs to obtain vector data from the SSD. The retrieval process starts from the start node 13 as the first retrieval node, which includes obtaining the vector data of the original vector 13 represented by the index node 13 and the adjacency table of the index node 13 from the page of the SSD stored the index node 13, calculating the distances between the original vector 13 and the query vector, obtaining the ID of the two neighbor index nodes of the index node 13 according to the adjacency table, obtaining the PQ compressed vector data of the original vector 8 and the original vector 9 corresponding to the neighbor index node 8 and the neighbor index node 9 of the index node 13 from the memory, and calculating the PQ distances of the PQ compressed vector of the original vector 8 and the query vector, and the PQ distances of the PQ compressed vector of the original vector 9 and the query vector respectively.

If the PQ compression vector of the original vector 9 is closer to the query vector, the index node 9 corresponding to the original vector 9 will be taken as the next retrieval node and stored in the candidate pool. Obtaining the vector data of the original vector 9 represented by the index node 9 and the adjacency table of the index node 9 from the SSD. Obtaining the vector data of the original vector 9 represented by index node 9 and the adjacency table of index node 9 from the SSD. If the distance between the original vector 9 and the query vector is less than the distance between the original vector 13 and the query vector, the IDs of the original vectors represented by the neighbor index nodes of index node 9 will be obtained according to the adjacency table of index node 9 and the PQ distances between the PQ compressed vectors of the original vectors represented by the neighbor index nodes of the index node 9 and the query vector will continue to be calculated according to the data of the PQ compressed vectors of the original vectors represented by the neighbor index nodes of the index node 9 in memory, and the index node 6 corresponding to the original vector with the closest PQ distance will be stored in the candidate pool and be taken as the next retrieval node.

Similarly, index node 3, index node 12 and index node 4 are also successively stored in the candidate pool as retrieval nodes. Finally, in the retrieval proves, calculating the distance between the original vector 4 represented by the index node 4 and the query vector, calculating the PQ distance between the PQ compressed vector of the original vector represented by the neighbor index node of the index node 4 and the query vector, storing the index node corresponding to the original vector with the closer PQ distances into the candidate pool are processed successively. After calculating the distance between the original vector represented by the neighbor index node of the index node 4 corresponding to the original vector with the closer PQ distance and the query vector, and if the distance is greater than the distance between the original vector 4 represented by index node 4 and the query vector, the retrieval process will be ended, and index node 4 will be used as the termination node of the retrieval.

Index node 13 is the starting node of this retrieval process, and index node 4 is the ending node of this retrieval process. It shall be understood the starting node can be the central node of all the index nodes, that is, the position of the starting node is at the centroid of all the index nodes, and the starting node can also be any one of the index nodes. In the embodiment of this disclosure, there is no specific restriction on the type of the starting node.

Assuming that the data type of the original vector is 8-bit unsigned integer (uint8), each original vector (128 dimensions) needs 128B of storage capacity, and 48 neighbor IDs are stored in the adjacency table of each retrieval node. Assuming that the data type of the neighbor ID is integer (int), each neighbor ID needs 4B of storage capacity, so the data size of the original vector and its adjacency table included in each index node is about 320B.

In the retrieval process, the data of the 4 KB of the page in which the start node 13 is stored, the data of the 4 KB of the page in which the index node 9 is stored, the data of the 4 KB of the page in which the index node 6 is stored, the data of the 4 KB of the page in which the index node 3 is stored, the data of the 4 KB of the page in which the index node 12 is stored, and the data of the 4 KB of the page in which the result index node 4 is stored are sequentially acquired from the solid state disk. Among the data of the 4 KB of each page, only the vector data of the original vectors represented by the start node 13, the index node 9, the index node 6, the index node 3, the index node 12, and the index node 4, and the related adjacent tables are used, and a large amount of other data is discarded, which causes a large amount of data waste.

Therefore, according to the embodiment of the disclosure, a retrieval apparatus, method and storage medium are proposed. In the retrieval method, the graph partition algorithm is used to change the storage layout on the SSD, and the index node and the neighbor index node whose weight of the edge is greater than the threshold value are stored in the same partition, that is, in the same page of the SSD. So each time the data on the SSD is read, the index node and the data of several neighbor index nodes can also be read, which could improve the efficiency of the process of reading data. At the same time, in the process of retrieval, while waiting to obtain data from the SSD, the unprocessed data in the data obtained from the last access can be processed synchronously, which also further improves the efficiency of the retrieval process.

In order to explain in detail a retrieval method in an embodiment of the disclosure, the specific retrieval method will be described below in combination with FIGS. 3*a*, 3*b*, 3*c*, 4*a*, 4*b*, 4*c*, 4*d*, 4*e* and 5.

It shall be understood that all methods in the embodiments can be executed by an electronic device with a processor.

First, a graph partition algorithm in an embodiment of the disclosure is described with reference to FIGS. 3*a*, 3*b*, and 3*c*.

The graph partition algorithm may generally divide a complete large graph into a plurality of partitions according to points or edges, and each partition preserves the topology and relationship of the large graph as much as possible, and each partition may be stored using a node device in a distributed cluster system.

Figure 3A:
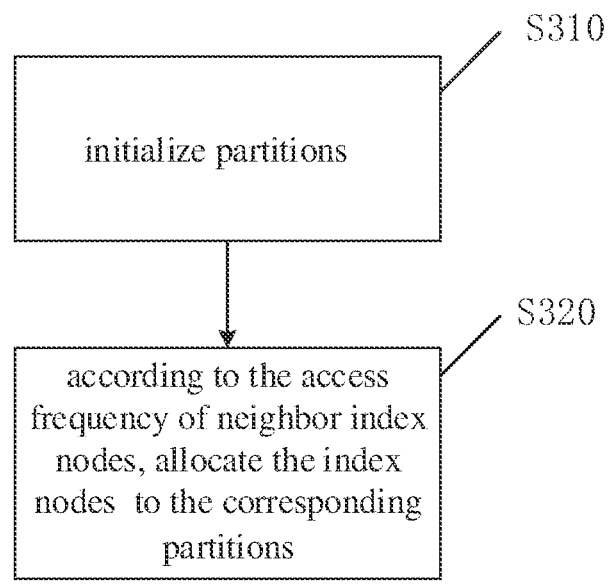
FIG. 3a illustrates a schematic diagram of a graph partition method.
Figure 3B:
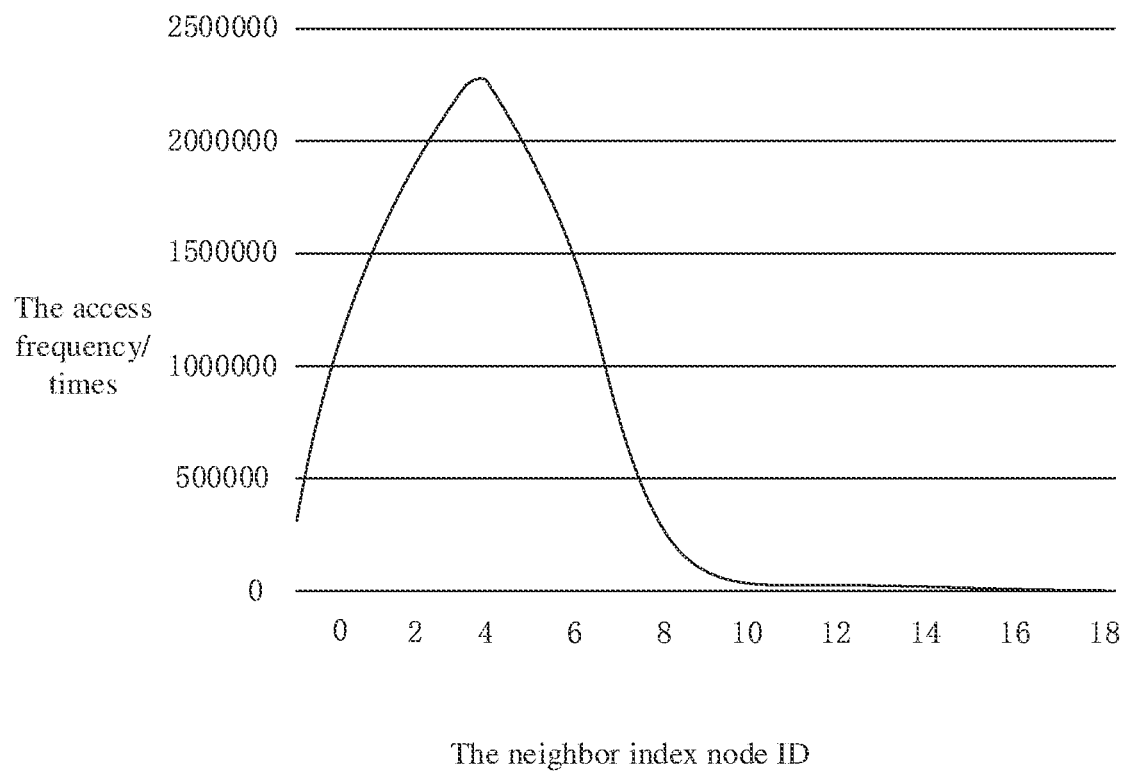
FIG. 3b illustrates a schematic diagram of access frequency of neighbor index nodes of an index node.
Figure 3C:
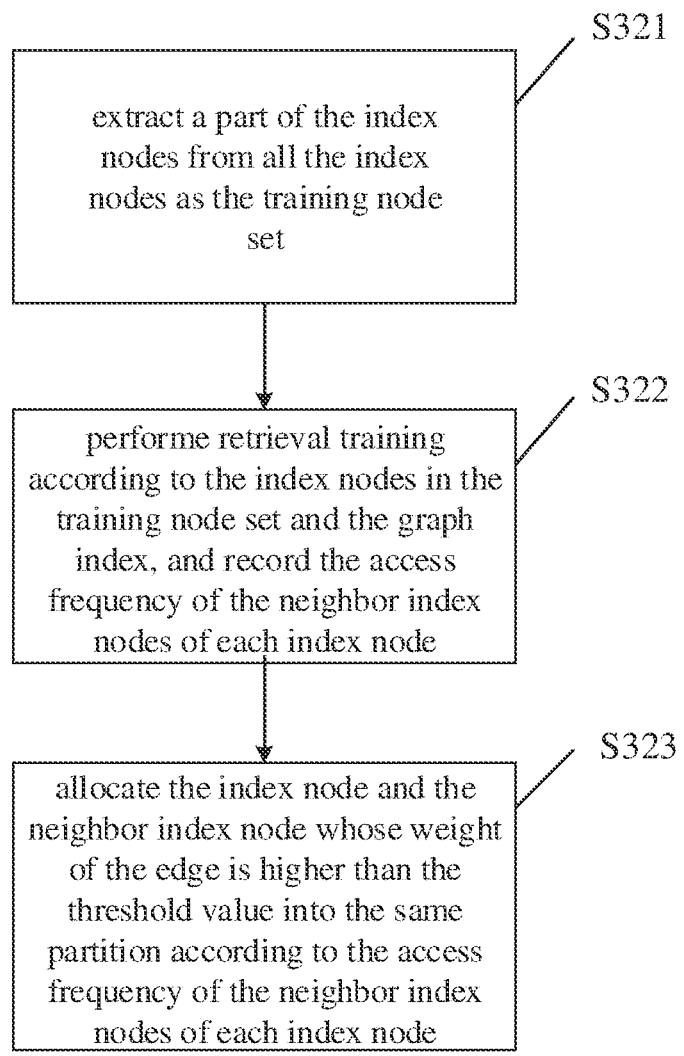
FIG. 3c illustrates a method diagram of allocating index nodes according to the access frequency of neighbor index nodes.

As shown in FIG. 3*a*, a graph partition method in an embodiment of the disclosure may include the steps:

In 310, an electronic device initializes partitions.

It shall be understood the graph index includes index nodes corresponding to all original vectors. And each index node includes vector data of an original vector, an adjacency table of the index node, and a size of the adjacency table of the index node. The size of each page corresponding to one partition on the SSD can be determined according to the data type of the original vector, the size of the SSD, etc., so that the size of each partition can be determined, and then the number of index nodes can be stored on one partition can be determined.

It shall be understood each partition may be provided with an identification number ID, and each partition corresponds to a page on a solid state disk.

In 320, the electronic device allocate the index nodes to the corresponding partitions according to the access frequency of neighbor index nodes.

It shall be understood each index node may have a plurality of neighbor index nodes, and the number of all neighbor index nodes is likely to exceed the number of index nodes that can be stored by one partition. As shown in FIG. 3b, assuming that an index node has 18 neighbor index nodes, it can be known that three or four of these 18 neighbor index nodes may have higher access frequency, while the other neighbor index nodes have lower access frequency. Therefore, each index node can be allocated to the partition of the neighbor index nodes with the highest access frequency by counting the access frequency of neighbor index nodes to improve the efficiency of the retrieval process. The specific method will be described in detail below.

For example, index node A has ten neighbor index nodes, including index node B, index node C, index node D, index node E, index node F, index node G, index node H, index node I, index node J, and index node K. It is learned with the index training of the graph index that index node B, index node C, and index node D are high-frequency neighbor index nodes among the ten neighbor index nodes, so the four index nodes including index node A, index node B, index node C, and index node D, are stored in the same partition as much as possible.

In one possible implementation, a write lock can be set on each partition. When the write lock is enabled, it is possible to disable the continued allocation of index nodes to the partition.

It shall be understood all partitions can be integrated into the first graph index, which is stored on the SSD, and each partition is stored on the corresponding page of the SSD.

An embodiment of the process of allocating an index node to a corresponding partition according to the neighbor access frequency will be explained with reference to FIG. 3c below. As shown in FIG. 3c, the process can include the steps:

S321, the electronic device extract a part of the index nodes from all the index nodes as the training node set.

It shall be understood the number of index nodes in the training node set may be set according to a specific scenario, such as the number of index nodes in the first graph index, etc., and 1% of the number of index nodes may be extracted as the training node set according to an average statistical result, etc. . . . In the embodiment of the disclosure, the number of index nodes in the training node set is not specifically limited.

S322, the electronic device perform retrieval training according to the index nodes in the training node set and the graph index, and record the access frequency of the neighbor index nodes of each index node.

It shall be understood the ID of the neighbor index nodes of each index node in the graph index is recorded in the adjacency table of the index node. The graph index may include all index nodes and the neighbor relationships between the index nodes. There is a line between each index node and its neighbor index node in the graph index, which is an edge. The neighbor relationships of the index nodes can be expressed in the form of edges. When performing the retrieval training of the index nodes in the training node set, the access frequency of the neighbor index nodes of each index node can be recorded. The higher the access frequency, the higher the weight of the edge between the neighbor index nodes and the index nodes can be set, that is, the access frequency and the weight of the edge are one-to-one correspondence.

S323, the electronic device allocate the index node and the neighbor index node whose weight of the edge is higher than the threshold value into the same partition according to the access frequency of the neighbor index nodes of each index node.

It shall be understood the specific value of the threshold may be set according to a specific scenario to control the number of neighbor index nodes whose weights of the edges of the index nodes are higher than the threshold In the embodiments of the disclosure no specific limit on the specific value of the threshold.

It shall be understood the number of index nodes that can be stored in each partition is a fixed value, and the relationship between the sum of the number of index nodes and the number of neighbor index nodes whose weights are higher than the threshold value, and the number of index nodes that can be stored in each partition can be greater than, less than, or equal to.

It shall be understood if the sum of the number of index nodes and the number of neighbor index nodes whose weights are higher than the threshold value is more than the number of index nodes that can be stored in each partition, or if the write lock of the partition of the neighbor index nodes whose edge weight is higher than the threshold is enabled, the index nodes that have not been allocated and/or the neighbor index nodes whose weight is higher than the threshold value can be randomly stored in other unfilled partitions.

In one possible implementation, it is possible to set a concurrent queue to store the ID of the unfilled partition. If an index node is needed to be randomly allocated, an unfilled partition used to allocate the index node could be randomly selected to improve the allocation efficiency.

Figure 3D:
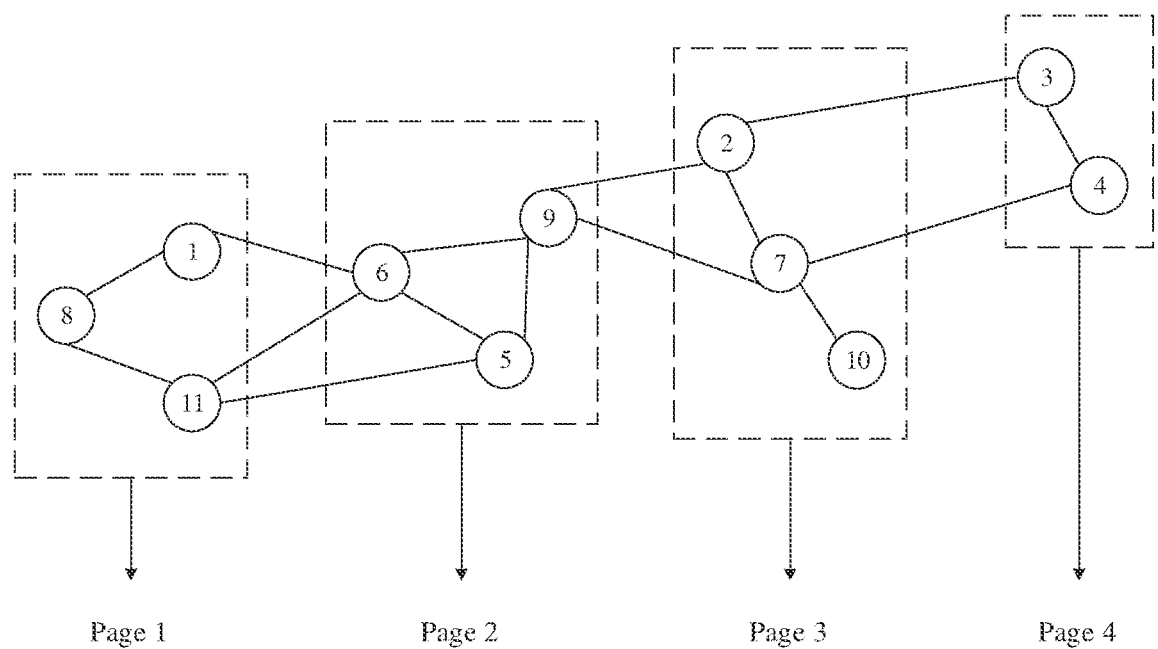
FIG. 3d illustrates partitions corresponding to the pages on the SSD.

As shown in FIG. 3d, after dividing the graph index by the above method, the partitions corresponding to the pages on the SSD are stored according to the neighbor access frequency of each index node. The weight of edges between index node 8 and index node 11, index node 8 and index node 1, index node 8 and index node 11, and index node 8 and index node 1 are higher than the threshold value, Therefore, index node 8, index node 1, and index node 11 are stored in the same partition corresponding to page 1 on the SSD.

The weight of edges between index node 6 and index node 9, index node 6 and index node 5, index node 9 and index node 5 are higher than the threshold value, so index node 5, index node 6 and index node 9 are stored in the same partition corresponding to page 2 on the SSD. The weight of edges between index node 7 and index node 2, and index node 7 and index node 10 are higher than the threshold value, so index node 2, index node 7 and index node 10 are stored in the same partition corresponding to page 3 on the SSD. The weight of edges between index node 3 and index node 4 are greater than the threshold value, so index node 3 and index node 4 are stored in the same partition corresponding to page 4 on the SSD.

Therefore, in the process of retrieval beginning from the start node, each time the data is read from the SSD, the page read includes the vector data of the original vector represented by the retrieval node and its neighbor index nodes.

Based on the vector data of the original vector represented by the retrieval node and its neighbor index node, the Euclidean distances between the original vector represented by the retrieval nodes and the query vector, and between the neighbor index nodes and the query vector can be calculated. So it may be not needed to repeatedly reading the data on the page where the neighbor index nodes of the retrieval node is located from the SSD, which may reduce the number of times the data is read from the solid-state disk, thereby may improve the retrieval efficiency and avoid the occurrence of more redundant data.

A retrieval method in an embodiment of the disclosure is described below with reference to FIGS. 4a, 4b, 4c, 4d and 4c.

In the graph partition algorithm described above, the graph index may be updated to a new graph index (the first graph index), and the new graph index includes a plurality of partitions, each of which is stored on a page of the SSD.

As described in the background technology, only PQ compressed vectors of all original vectors are stored in the memory, and the first graph index including vector data of all original vectors is stored on the SSD. When the electronic device obtains the retrieval request, the processor of the electronic device will start the retrieval process from the starting node on the first graph index according, and end until all the retrieval nodes in the candidate pool are retrieved, wherein, the query vector is the vector to be retrieved in the retrieval request.

Figure 4A:
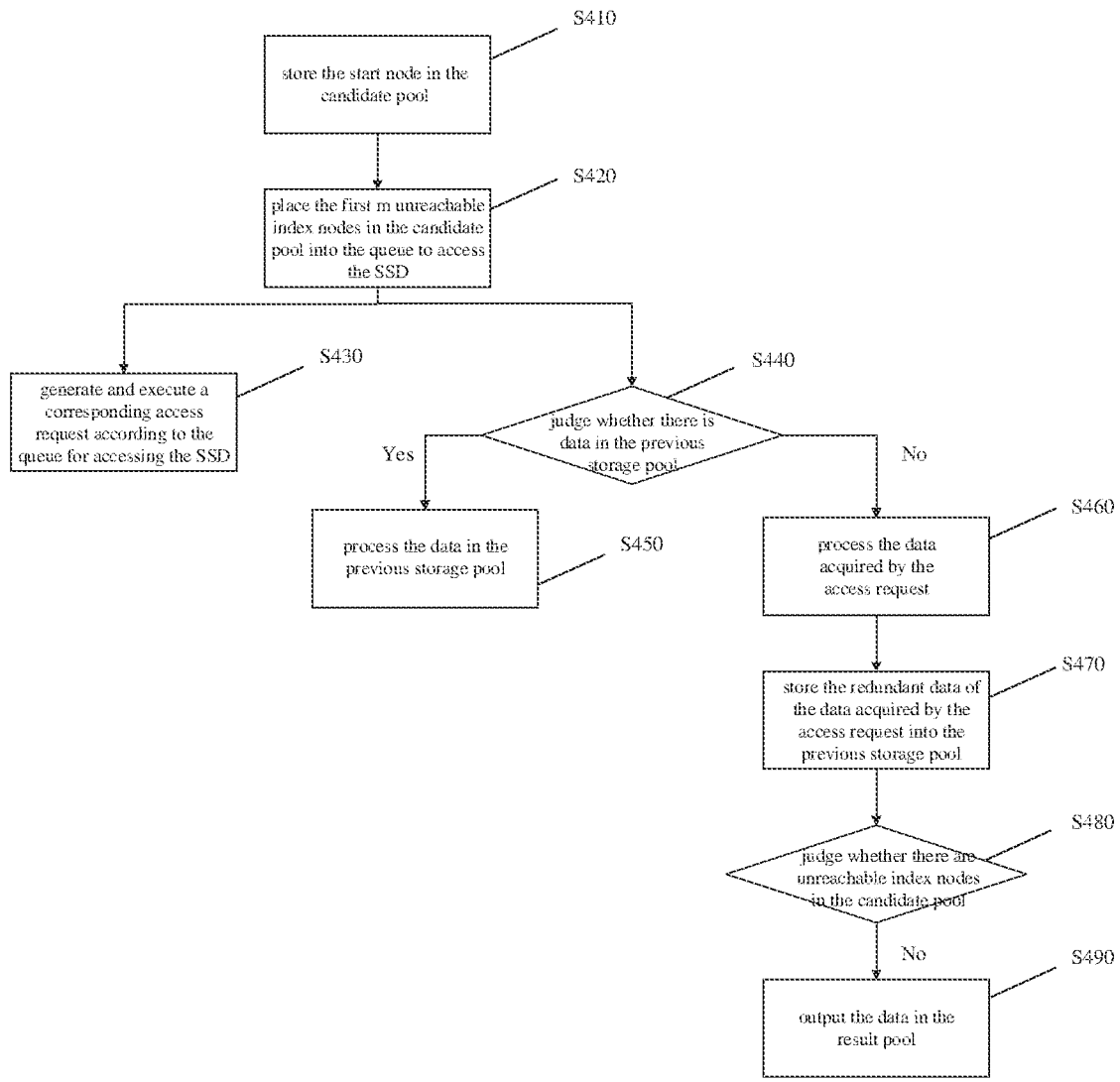
FIG. 4a illustrates a schematic diagram of a retrieval method.

As shown in FIG. 4a, a retrieval method in an embodiment of the disclosure may includes the following steps:

The Candidate pool, the result pool, the queue to access SSD and the previous storage pool can be initialized. The candidate pool is used to store the starting node and other retrieval nodes in this retrieval. The retrieval nodes are the index nodes corresponding to the original vector that needs to obtain vector data from SSD. The result pool is used to store the results after processing the data in the retrieval node and the corresponding retrieval node. The previous storage pool is used to store the redundant data in the data obtained from the SSD, that is, the previous storage pool is used to store the data of the index nodes that has not been processed in the data obtained from the SSD. During the retrieval, the number of index nodes in the candidate pool can be limited by given parameters, and index nodes in the candidate pool can also be set from near to far according to the PQ distances between the PQ compressed vectors of corresponding original vectors and the query vector.

In 410, the electronic device store the start node in the candidate pool.

It shall be understood, as described above, the start node may be the central node of all index nodes or any one of all index nodes. Similarly, the type of the start node is not specifically limited in the embodiments of the disclosure.

In 420, the electronic device place the first m unreachable index nodes in the candidate pool into the queue to access the SSD.

It shall be understood the first m unreachable index nodes in the candidate pool are the m unreachable index nodes which have the closest PQ distances to the query vector, wherein m is a natural number greater than or equal to 1. The number of m may be set according to a specific scenario. In the embodiment of the disclosure, no specific limitation is imposed on the specific value of m.

In 430, the electronic device generate and execute a corresponding access request according to the queue to access the SSD.

It shall be understood it is possible to generate the corresponding access request to the SSD by obtaining the IDs of the index nodes stored in the queue of the SSD, so as to acquire vector data of the original vectors corresponding to the index nodes and their adjacency tables.

In 440, the electronic device judge whether there is data in the previous storage pool. If so, go to step S450, and if not, go to step S460.

In 450, the electronic device process the data in the previous storage pool. And after completing step S450, go to step S460.

It shall be understood each time a solid state disk is accessed, several index nodes may be included in the acquired data of a page, where the data of some index nodes may not be processed, and the data of these unprocessed index nodes will be stored in the previous storage pool. Therefore, while waiting for step S430 to obtain the data on the SSD, the Euclidean distances between the original vectors corresponding to the index nodes in the previous storage pool and the query vector can be calculated in parallel, and the results and the corresponding index nodes can be stored in the result pool. At the same time, the PQ distances between the PQ compression vector corresponding to the index nodes in the adjacent table of the index node in the previous storage pool and the query vector can also be calculated in parallel, and the results and corresponding index nodes can be stored in the candidate pool. It shall be understood the dichotomy insertion sorting algorithm can be used to store the aforementioned results and corresponding index nodes in the candidate pool to maintain the sorting rules in the candidate pool.

It shall be understood that since the data in the previous storage pool is the redundant data, previously obtained from SSD with the access request based on the retrieval nodes in the candidate pool, there is a high probability that the Euclidean distances between the query vector and index nodes in the redundant data are close. Therefore, in the process of accessing a SSD, parallel processing of data from the previous storage pool can not only improve the overall retrieval speed through parallel processing, but also improve the accuracy of query results through enriching the result pool. At the same time, it can also improve the accuracy of query results by increasing the number of retrieval nodes in the candidate pool.

It shall be understood that the PQ compression vectors of the original vectors can be obtained by accessing memory. Since the speed of reading data from memory is much faster than that of SSD, by quickly obtaining the PQ compression vectors of the original vectors, the PQ distances between the query vector and the PQ compression vectors corresponding to the index nodes in the adjacent table of the index nodes in the previous storage pool, can be quickly obtained, which can improve the retrieval speed. At the same time, the accuracy of query results can also be improved by adding the aforementioned results to the candidate pool.

It shall be understood in the adjacency table of the index nodes in the previous storage pool, the original vector represented by some neighbor index nodes recorded may be far away from the query vector. These neighbor index nodes have a small probability of being retrieval nodes, and may not be stored as retrieval nodes in the candidate pool. Therefore, the pruning optimization method could be used to improve the efficiency of updating the index nodes in the candidate pool, so as to reduce the computational load in the retrieval process. The steps of the specific pruning optimization method according to the embodiment of the disclosure will be explained in detail below.

In 460, the electronic device process the data acquired by the access request.

After the access request is executed, the data of the original vector corresponding to the first m unreachable index nodes in the candidate pool and the adjacency tables of the first m unreachable index nodes can be acquired. The Euclidean distances between the original vectors corresponding to the first m unreachable index nodes and the query vector can be calculated based on the vector data of the original vectors corresponding to the first m unreachable index nodes, and the results and the corresponding index nodes of the calculation can be stored in the result pool. And the PQ distances between the query vector and the original vectors corresponding to the index nodes in the adjacency tables of the first m unreachable index nodes can be calculated, and the results and the corresponding index nodes can be stored in the candidate pool according to the sorting rule.

In 470, the electronic device store the redundant data of the data acquired by the access request into the previous storage pool.

As described above, the unprocessed data of the index node in the access request can be stored in the previous storage pool as the redundant data in the data obtained by the access request.

In 480, the electronic device judge whether there are unreachable index nodes in the candidate pool. If yes, go to step S490, and if no, go to step S420.

It shall be understood the vector data of the original vector of the unreachable index nodes in the candidate pool needs to be obtained from the SSD every time in the above method and the length of the candidate pool is fixed. If the candidate pool is not updated and all the index nodes in it are accessed, the retrieval process reaches the termination condition. In 490, the electronic device output the data in the result pool.

Figure 4B:
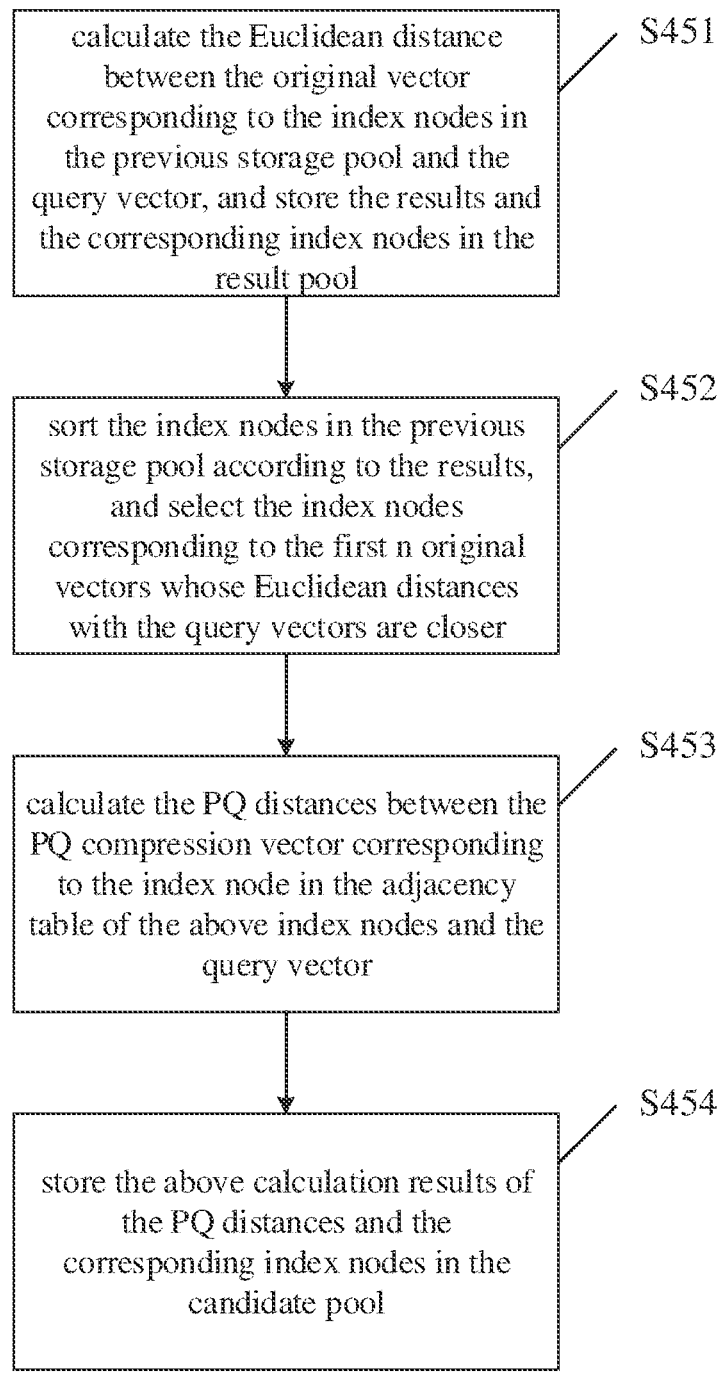
FIG. 4b illustrates a schematic diagram of a pruning optimization method.
Figure 4C:
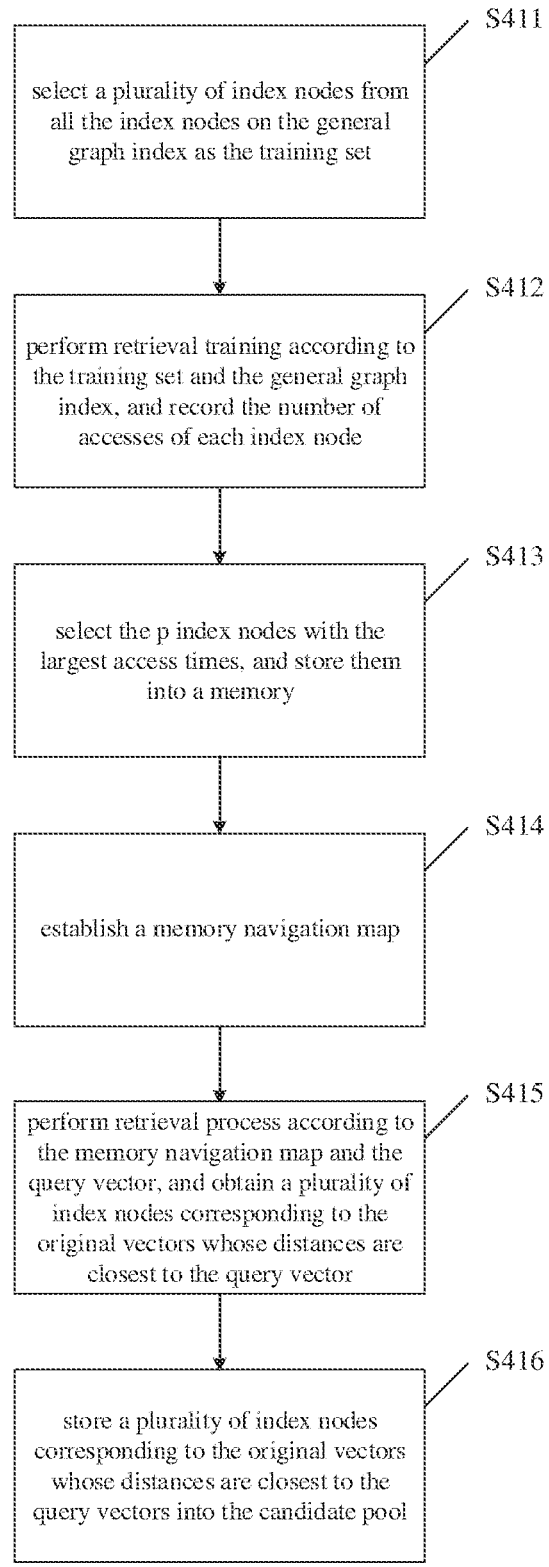
FIG. 4c illustrates a schematic diagram of a hot spot selection method.

It shall be understood in the foregoing retrieval method, the selection of the index node sin the candidate pool is very important for improving the retrieval efficiency. For the index nodes in the candidate pool, it is possible to select the above central node directly or by the hotspot selection method. As shown in FIG. 4b, the specific steps of the hotspot selection method can be:

In 411, the electronic device select a plurality of index nodes from all the index nodes on the graph index as the training set.

It shall be understood the number of index nodes in the training set may be determined according to specific requirements. In the embodiments of the disclosure, the selection method and the number of index nodes in the training set are not specifically limited.

In 412, the electronic device perform retrieval training according to the training set and the graph index, and record the number of accesses of each index node.

In 413, the electronic device select the p index nodes with the largest access times, and store them into a memory.

It shall be understood p is a natural number greater than or equal to 1.

It shall be understood the speed of accessing the memory is faster than that of accessing the SSD. Therefore, storing the p index nodes with the largest access times in memory in advance can shorten the time of accessing and improve the retrieval efficiency. In 414, the electronic device establish a memory navigation map.

A graph index algorithm may be used, including HNSW, NSG, or Vanama, to create a memory navigation map.

In 415, the electronic device perform retrieval process according to the memory navigation map and the query vector, and obtain a plurality of index nodes corresponding to the original vectors whose distances are closest to the query vector.

It shall be understood a plurality of index nodes corresponding to the original vectors whose distances are closest to the query vector are hot spot index nodes.

It shall be understood the hot spot index nodes may be index nodes with a relatively large number of access times. Therefore, the hot spot index nodes and their number may be determined according to the historical access data for the graph index and specific requirements. For example, the start node and the neighbor index nodes in the historical retrieval may be selected. In the embodiment of the disclosure, the selection method and the number of the hot spot index nodes are not specifically limited.

In 416, the electronic device store a plurality of index nodes corresponding to the original vectors whose distances are closest to the query vectors into the candidate pool.

According to the hot spot selection method, the time for accessing and acquiring data can be shortened by storing a part of the index nodes in the memory, and the retrieval efficiency can be further improved by setting the index nodes in the candidate pool. The steps of a pruning optimization method may be as shown in FIG. 4b:

In 451, the electronic device calculate the Euclidean distances between the original vectors corresponding to the index nodes in the previous storage pool and the query vector, and store the results and the corresponding index nodes in the result pool.

In 452, the electronic device sort the index nodes in the previous storage pool according to the results, and select the index nodes corresponding to the first n original vectors whose Euclidean distances with the query vectors are closer.

It shall be understood n is an integer greater than or equal to 0. A specific threshold value may be set according to the Euclidean distances between the original vectors corresponding to the index nodes in the previous storage pool, or a specific scenario, and the n index nodes whose Euclidean distance is greater than or equal to the threshold value may be selected. In the embodiment of the disclosure, the value of n is not specifically limited.

In 453, the electronic device calculate the PQ distances between the PQ compression vector corresponding to the index node in the adjacency table of the above index nodes and the query vector.

In 454, the electronic device store the above calculation results of the PQ distances and the corresponding index nodes in the candidate pool.

The pruning optimization method avoids calculating the PQ distances between the PQ compression vectors corresponding to the index nodes in the adjacent tables of all index nodes in the previous storage pool and the query vector, improves calculation efficiency, reduces calculation time, improves efficiency of updating index nodes in the candidate pool.

It shall be understood processing the data of the index nodes in the previous storage pool in parallel during the waiting process in step S430 may improve the efficiency of the retrieval process and shorten the total retrieval time. It shall be understood step S440 may not be executed when the retrieval method is executed for the first time.

Figure 4D:
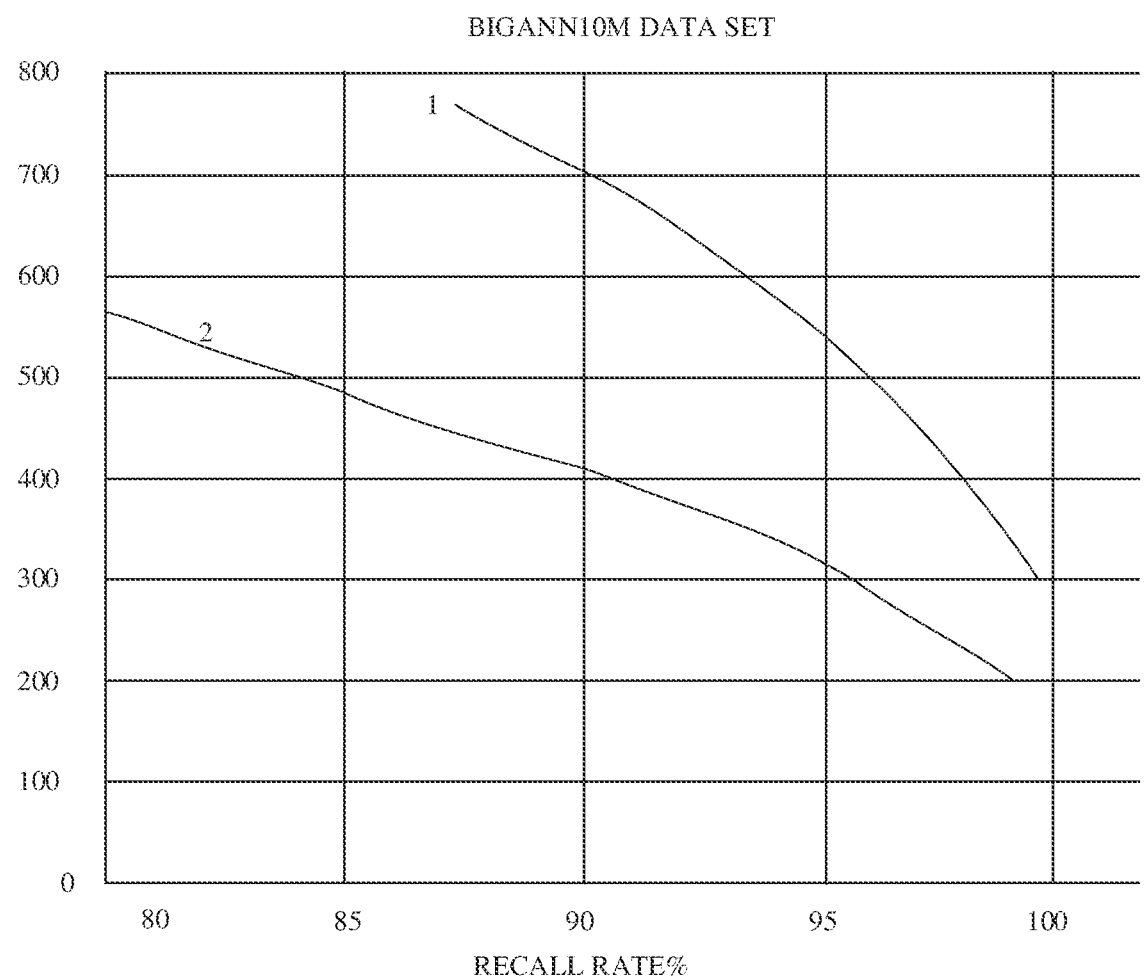
FIG. 4d illustrates a schematic diagram of effect comparison.
Figure 4E:
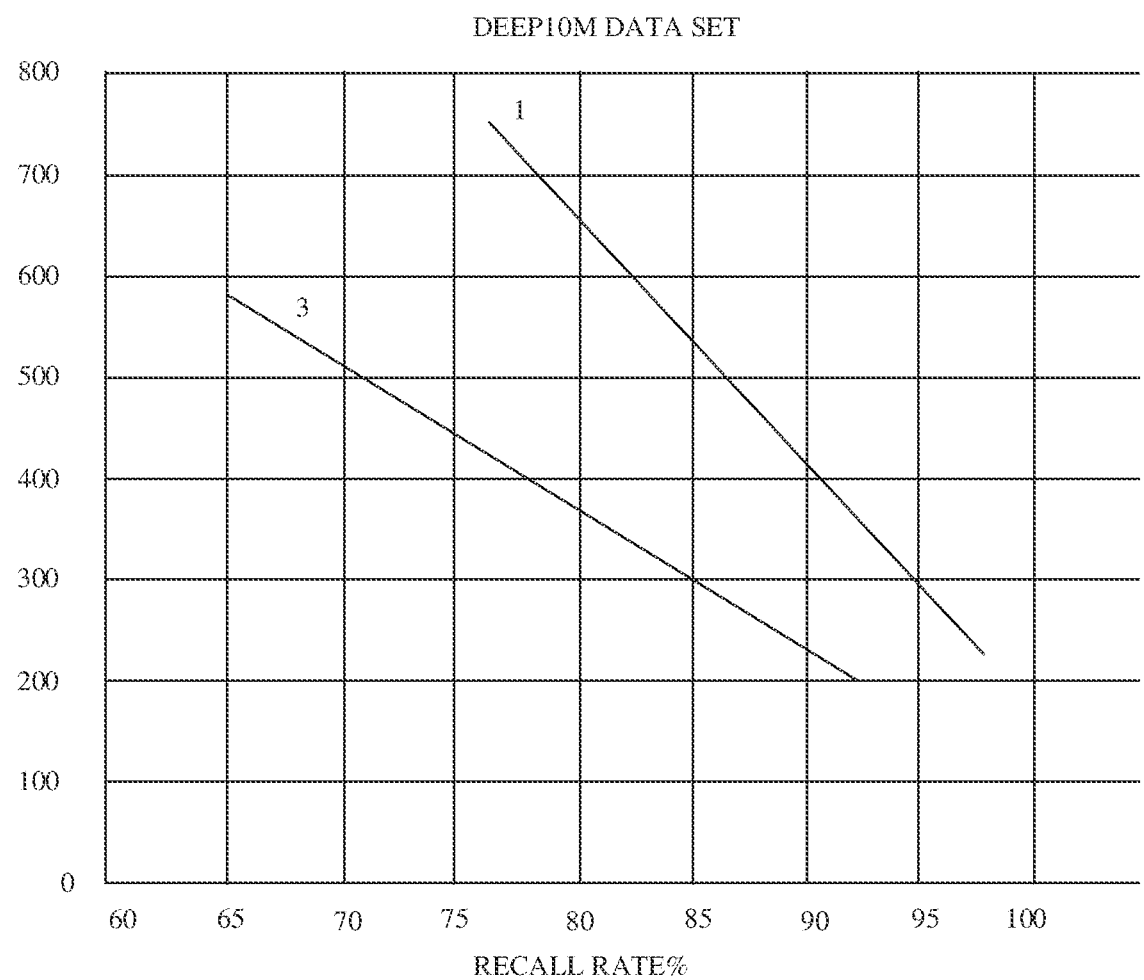
FIG. 4e illustrates another schematic diagram of effect comparison.

FIGS. 4d and 4e show the effects of using the retrieval method of the disclosure and using the Disk ANN algorithm on the BIGANN10M data set and the DEEP10M data set.

As shown in FIGS. 4d and 4e, compared with the DiskANN algorithm, the recall rate obtained by using the retrieval method of this disclosure on BIGANN10M dataset and DEEP10M dataset has been greatly improved, with the improvement effect of 1.46× and 1.71× respectively.

The retrieval method executes a retrieval process for a query vector based on the rearranged graph index and the partition. Unlike the conventional retrieval method, the data of the retrieval nodes and their plurality of neighbor index nodes can be acquired each time the SSD is accessed, thereby improving the efficiency of acquiring the data from the SSD. At the same time, in the process of accessing the SSD, the redundant data previously accessed in parallel is processed, thereby further improving the efficiency of the retrieval process.

Some embodiments of the disclosure also provide an electronic device comprising a memory for storing instructions for execution by one or more processors of the electronic device, and a processor that is one of the one or more processors of the electronic device for performing the retrieval method described above.

Figure 5:
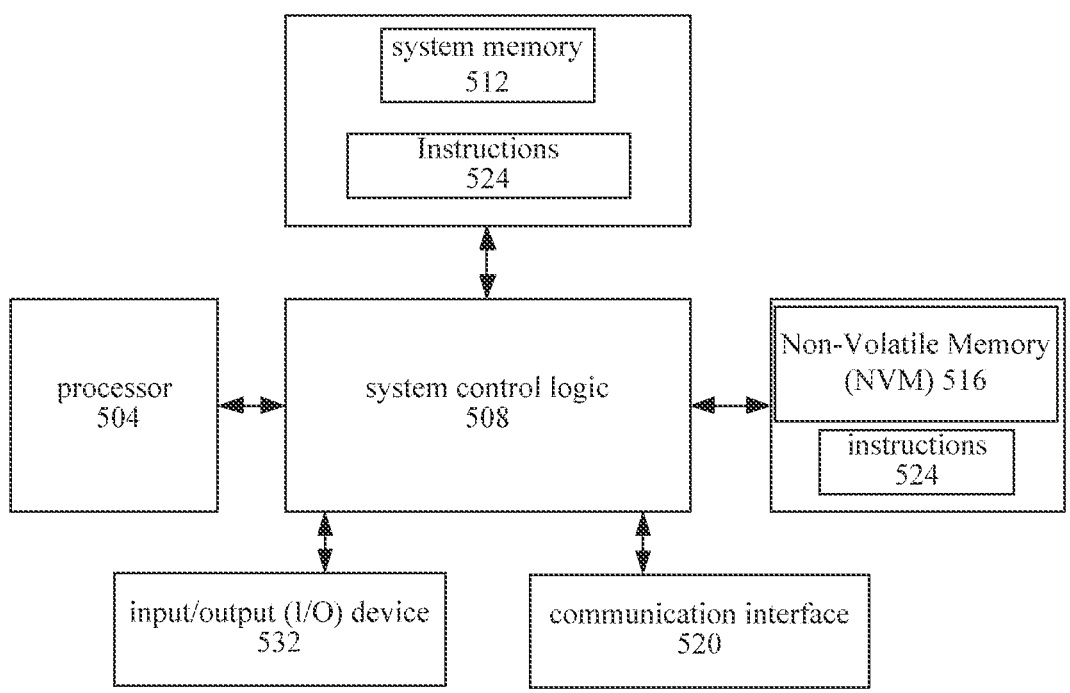
FIG. 5 illustrates a schematic structural diagram of an electronic device.

FIG. 5 illustrates a block diagram of one electronic device in some embodiments provided herein. In one embodiment, electronic device 500 may include one or more processors 504, system control logic 508 coupled to at least one of processors 504, system memory 512 coupled to system control logic 508, non-volatile memory (NVM) 516 coupled to system control logic 508, and a network interface 520 coupled to system control logic 508.

In some embodiments, the processor 504 may include one or more single-core or multi-core processors. In some embodiments, the processor 504 may include any combination of a general purpose processor and a special purpose processor (e.g., a graphics processor, an application processor, a baseband processor, etc.). In embodiments where the electronic device 500 employs an eNB (evolved node B) 501 or an RAN (radio access network) controller 502, the processor 504 may be configured to perform various compliant embodiments.

In some embodiments, the system control logic 508 may include any suitable interface controller to provide any suitable interface to at least one of the processors 504 and/or any suitable device or component in communication with the system control logic 508.

In some embodiments, system control logic 508 may include one or more memory controllers to provide an interface to system memory 512. System memory 512 may be used to load and store data and/or instructions. The memory 512 of the electronic device 500 may include any suitable volatile memory, such as a suitable dynamic random access memory (DRAM), in some embodiments.

NVM/memory 516 may include one or more tangible, non-transitory computer-readable medium for storing data and/or instructions. In some embodiments, the NVM/memory 516 may include any suitable non-volatile memory such as flash memory and/or any suitable non-volatile storage device, such as at least one of an HDD (hard disk drive), a CD (compact Disc) drive, a DVD (digital versatile Disc) drive.

The NVM/memory 516 may include a portion of storage resources on the device on which the electronic device 500 is installed, or it may be accessed by, but not necessarily part of, the device. For example, NVM/storage 516 may be accessed via a network interface 520 via a network.

In particular, system memory 512 and NVM/memory 516 may include temporary and permanent copies of instructions 524, respectively. The instructions 524 may include instructions that, when executed by at least one of the processors 504, cause the electronic device 500 to implement the above-described construction method. In some embodiments, instructions 524, hardware, firmware, and/or software components thereof may additionally/alternatively be disposed in system control logic 508, network interface 520, and/or processor 504.

Network interface 520 may include a transceiver for providing a radio interface for electronic device 500 to communicate with any other suitable device (e.g., front-end module, antenna, etc.) over one or more networks. In some embodiments, network interface 520 may be integrated with other components of electronic device 500. For example, the network interface 520 may be integrated with at least one of the system memory 512, the NVM/memory 516, and a firmware device (not shown) having instructions that, when executed by at least one of the processors 504, the electronic device 500 implements the above-described construction method.

Network interface 520 may further include any suitable hardware and/or firmware to provide a multiple-input multiple-output radio interface. For example, the network interface 520 may be a network adapter, a wireless network adapter, a telephone modem, and/or a wireless modem.

In one embodiment, at least one of the processors 504 may be packaged together with logic for one or more controllers of the system control logic 508 to form a system SiP. In one embodiment, at least one of the processors 504 may be integrated on the same die as logic for one or more controllers of the system control logic 508 to form a system-on-chip (SoC).

The electronic device 500 may further include an input/output (I/O) device 532. I/O device 532 may include a user interface to enable a user to interact with electronic device 500; the peripheral component interface is designed so that the peripheral component can also interact with the electronic device 500. In some embodiments, the electronic device 500 further includes a sensor for determining at least one of environmental conditions and location information associated with the electronic device 500.

In some embodiments, the user interface may include, but is not limited to, a display (e.g., a liquid crystal display, a touch screen display, etc.), a speaker, a microphone, one or more cameras (e.g., still image cameras and/or cameras), a flashlight (e.g., a light emitting diode flash), and a keyboard.

In some embodiments, peripheral component interfaces may include, but are not limited to, non-volatile memory ports, audio jacks, and power interfaces.

In some embodiments, the sensors may include, but are not limited to, gyroscope sensors, accelerometers, proximity sensors, ambient light sensors, and positioning units. The positioning unit may also be part of or interact with the network interface 820 to communicate with components of the positioning network (e.g., a Global Positioning System (GPS) satellite).

The embodiments disclosed herein may be implemented in hardware, software, firmware, or a combination of these implementations. Embodiments of the disclosure may be implemented as a computer program or program code executing on a programmable system including at least one processor, a storage system (including volatile and non-volatile memory and/or storage elements), at least one input device, and at least one output device.

Program code may be applied to the input instructions to perform the functions described herein and to generate output information. The output information may be applied to one or more output devices in a known manner. For purposes of this application, a processing system includes any system having a processor such as, for example, a digital signal processor (DSP), a microcontroller, an application specific integrated circuit (ASIC), or a microprocessor.

The program code may be implemented in a high-level programming language or an object-oriented programming language to communicate with the processing system. The program code may also be implemented in assembly language or machine language, if desired. Indeed, the mechanisms described herein are not limited in scope to any particular programming language. In either case, the language may be a compilation language or an interpretation language.

In some cases, the disclosed embodiments may be implemented in hardware, firmware, software, or any combination thereof. The disclosed embodiments may also be implemented as instructions carried by or stored on one or more temporary or non-temporary machine-readable (e.g., computer-readable) storage media, which may be read and executed by one or more processors. For example, the instructions may be distributed through a network or through other computer-readable media. Thus, a machine-readable medium may include any mechanism for storing or transmitting information in a form readable by a machine (e.g., a computer), including, but not limited to, a floppy disk, an optical disk, an optical disk, a read-only memory (CD-ROMs), a magneto-optical disk, a read-only memory (ROM), a random access memory (RAM), an erasable programmable read-only memory (EPROM), an electrically erasable programmable read-only memory (EEPROM), a magnetic or optical card, a flash memory, or a tangible machine-readable memory for transmitting information (e.g., a carrier wave, an infrared signal digital signal, etc.) in an electrical, optical, acoustic, or other form of propagated signal using the Internet. Thus, a machine-readable medium includes any type of machine-readable medium suitable for storing or transmitting electronic instructions or information in a form readable by a machine (e.g., a computer).

In the drawings, some structural or methodological features may be shown in a particular arrangement and/or sequence. However, it should be understood that such a particular arrangement and/or ordering may not be required. Rather, in some embodiments, these features may be arranged in a manner and/or sequence different from that shown in the illustrative drawings. In addition, the inclusion of structural or methodical features in a particular figure is not meant to imply that such features are required in all embodiments, and that such features may not be included or may be combined with other features in some embodiments.

It should be noted that each unit/module mentioned in each device embodiment of the disclosure is a logical unit/module. Physically, a logical unit/module may be a physical unit/module, may be a part of a physical unit/module, or may be implemented in a combination of a plurality of physical units/modules. The physical implementation of these logical units/modules is not most important. The combination of functions implemented by these logical units/modules is the key to solving the technical problem proposed in the disclosure. Furthermore, in order to highlight the inventive part of the disclosure, the above-mentioned device embodiments of the disclosure do not introduce units/modules which are not closely related to solving the technical problems set forth in the disclosure, which does not indicate that the above-mentioned device embodiments do not have other units/modules.

It is to be noted that in the examples and description of this patent, relational terms such as first and second etc. are used solely to distinguish one entity or operation from another entity or operation, and do not necessarily require or imply any such actual relationship or order between such entities or operations. Moreover, the terms "comprises," "comprising," or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without further limitation, an element defined by the statement; comprising does not rule out there are additional identical elements in the process, method, article, or apparatus that includes the element.

While the disclosure has been illustrated and described with reference to certain preferred embodiments thereof, it will be understood by those of ordinary skill in the art that various changes may be made in form and detail without departing from the scope of the disclosure.

The invention claimed is:

1. A retrieval apparatus comprising:
   a memory including a first memory for storing a first graph index and original vectors, and
   a second memory for storing product quantization (PQ) compressed vectors of the original vectors, wherein the PQ compressed vectors are obtained by compressing the original vectors through a product quantization (PQ) algorithm; and
   a processor configured to:
      obtain a retrieval request including a query vector;
      according to the query vector, generate and execute a first access request corresponding to the first memory corresponding to the first graph index and index nodes in a candidate pool, wherein the candidate pool is used to store retrieval nodes in a current retrieval, the retrieval nodes are the index nodes corresponding to the original vectors that needs to obtain vector data from the first memory, the first graph index is a graph index including all the index nodes and neighbor relationships of the index nodes, and each index node corresponds to one of the original vectors;
      obtain and process data corresponding to the first access request from the first memory when there is no redundant data in a previous storage pool, and store first access request results in a result pool, wherein the redundant data includes data of index nodes not used acquired from the first memory; and
      wherein obtain and process data corresponding to the first access request from the first memory when there is no redundant data in a previous storage pool, comprises: obtaining original vectors of index nodes corresponding to the first access request and adjacency tables of the index nodes from the first memory; calculating Euclidean distances between the original vectors and the query vector;
      process the redundant data when there is redundant data in the previous storage pool;
      wherein process the redundant data when there is redundant data in the previous storage pool, comprises:
      generating and executing a third access request corresponding to the first memory based on the redundant data and the query vector corresponding to index nodes in the previous storage pool;
      calculating Euclidean distances between original vectors corresponding to the index nodes in the previous storage pool and the query vector, according to data obtained by the third access request corresponding to the first memory, and storing third access request results and corresponding index nodes in the result pool; and output data in the result pool when the candidate pool does not include unreachable index nodes.

2. The apparatus according to claim 1, the index nodes in the candidate pool are arranged in order from near to far according to PQ distances from the query vector, wherein the PQ distances are distances between PQ compressed vectors corresponding to the index nodes and the query vector, and wherein:

according to the query vector, generate and execute a first access request corresponding to the first memory corresponding to the first graph index and index nodes in a candidate pool comprises:

corresponding to first m unreachable index nodes in the candidate pool, generating and executing a first access request corresponding to the first memory according to the query vector, wherein m is a natural number greater than or equal to 1, and the first m unreachable index nodes are m unreachable index nodes which have the closest PQ distances to the query vector in all the index nodes in the candidate pool.

3. The apparatus according to claim 1, wherein obtain and process data corresponding to the first access request from the first memory when there is no redundant data in a previous storage pool, and store first access request results in a result pool comprises:

obtaining data of original vectors corresponding to first m unreachable index nodes and adjacency tables of the first m unreachable index nodes from the first memory, wherein the first m unreachable index nodes are m unreachable index nodes which have the closest PQ distances to the query vector in all the index nodes in the candidate pool and the PQ distances are distances between PQ compressed vectors corresponding to the index nodes and the query vector; and calculating Euclidean distances between the original vectors corresponding to the first m unreachable index nodes and the query vector separately, and storing first access request results and corresponding index nodes in a result pool based on the vector data of the original vectors corresponding to the first m unreachable index nodes.

4. The apparatus according to claim 3, wherein obtain and process data corresponding to the first access request from the first memory when there is no redundant data in a previous storage pool, and store first access request results in a result pool, further comprising:

generating and executing a second access request corresponding to the second memory according to the query vector corresponding to index nodes in the adjacency tables of the first m unreachable index nodes; and calculating PQ distances between original vectors corresponding to the index nodes in the adjacency tables of the first m unreachable index nodes and the query vector separately, based on data obtained by the second access request corresponding to the second memory, and storing second access request results and corresponding index nodes in the candidate pool, wherein the PQ distances are distances between PQ compressed vectors corresponding to the index nodes and the query vector.

5. The apparatus according to claim 3, wherein obtain and process data corresponding to the first access request from the first memory when there is no redundant data in a previous storage pool, and store the results in a result pool, further comprising:

storing redundant data in the data acquired by the first access request corresponding to the first memory in the previous storage pool.

6. The apparatus of claim 1, wherein processing the redundant data when there is redundant data in the previous storage pool further comprises:

generating and executing a fourth access request corresponding to the second memory according to the query vector, corresponding to index nodes in adjacency tables of the index node in the previous storage pool; and calculating PQ distances between original vectors corresponding to the index nodes in the adjacency tables of the index nodes in the previous storage pool and the query vector separately, based on data obtained by the fourth access request corresponding to the second memory, and storing fourth access request results and the corresponding index nodes in the candidate pool, wherein the PQ distances are distances between PQ compressed vectors corresponding to the index nodes and the query vector.

7. The apparatus of claim 6, method of obtaining the index nodes in the previous storage pool comprises:

calculating Euclidean distances between original vectors corresponding to the index nodes in the previous storage pool and the query vector separately based on the redundant data;

sorting the index nodes in the previous storage pool according to the Euclidean distances, and selecting first n index nodes;

calculating PQ distances between original vectors corresponding to the index nodes in adjacency tables of the first n index nodes and the query vector separately according to PQ compressed vectors of the original vectors, wherein the PQ distances are distances between the PQ compressed vectors corresponding to the index nodes and the query vector; and storing the PQ distances and corresponding index nodes in the previous storage pool.

8. The apparatus according to claim 1, the first graph index is established by:

initializing fragments;

assigning index nodes to corresponding fragments according to the access frequency of neighbor index node; and synthesizing all the fragments into the first graph index.

9. The apparatus of claim 1, method of obtaining index nodes in the candidate pool comprises:

selecting a plurality of index nodes from all the index nodes in the first graph index as a training set;

performing retrieval training according to the training set and the first graph index, and recording access times of all the index nodes;

selecting p index nodes according to the access times of all the index nodes, and storing the p index nodes into a memory, wherein the p index nodes are p index nodes with the highest number of access times, and p is a natural number greater than or equal to 1;

establishing a memory navigation map;

retrieving a plurality of index nodes corresponding to original vectors whose distances are closest to the query vector according to the memory navigation map and the query vector; and storing the plurality of index nodes into the candidate pool.

10. The apparatus of claim 1, reading speed of the first memory is greater than reading speed of the second memory.

11. A method run by at least one processor, comprising:
obtaining a retrieval request including a query vector;
according to the query vector, generating and executing a first access request corresponding to a first memory corresponding to a first graph index and index nodes in a candidate pool, wherein the candidate pool is used to store retrieval nodes in a current retrieval, the retrieval nodes are the index nodes corresponding to the original vectors that need to obtain vector data from the first memory, the first graph index is a graph index including all the index nodes and neighbor relationships of the index nodes, and each index node corresponds to one of the original vectors;
obtaining and processing data corresponding to the first access request from the first memory when there is no redundant data in a previous storage pool, and storing first access request results in a result pool, wherein the redundant data includes data of index nodes not used acquired from the first memory; and wherein obtain and process the data corresponding to the first access request from the first memory when there is no redundant data in a previous storage pool, comprises:
obtaining original vectors of index nodes corresponding to the first access request and adjacency tables of the index nodes from the first memory; calculating Euclidean distances between the original vectors and the query vector;
processing the redundant data when there is redundant data in the previous storage pool;
wherein processing the redundant data corresponding to the presence of the redundant data in the previous storage pool, comprises:
generating and executing a third access request corresponding to the first memory based on the redundant data and the query vector corresponding to index nodes in the previous storage pool;
calculating Euclidean distances between original vectors corresponding to the index nodes in the previous storage pool and the query vector, according to data obtained by the third access request corresponding to the first memory, and storing third access request results and corresponding index nodes in the result pool; and
outputting data in the result pool when the candidate pool does not include unreachable index nodes.

12. A computer-readable storage medium having stored thereon the instructions that, when executed on an electronic device, cause the electronic device to perform a method comprising:
obtaining a retrieval request including a query vector;
according to the query vector, generating and executing a first access request corresponding to a first memory corresponding to a first graph index and index nodes in a candidate pool, wherein the candidate pool is used to store retrieval nodes in a current retrieval, the retrieval nodes are is the index nodes corresponding to the original vectors that need to obtain vector data from the first memory, the first graph index is a graph index including all the index nodes and neighbor relationships of the index nodes, and each index node corresponds to one of the original vectors;
obtaining and processing data corresponding to the first access request from the first memory when there is no redundant data in a previous storage pool, and storing the results in a result pool, wherein the redundant data includes data of index nodes not used acquired from the first memory; and wherein obtain and process the data corresponding to the first access request from the first memory when there is no redundant data in a previous storage pool, comprises:
obtaining original vectors of index nodes corresponding to the first access request and adjacency tables of the index nodes from the first memory; calculating Euclidean distances between the original vectors and the query vector;
processing the redundant data when there is redundant data in the previous storage pool;
wherein processing the redundant data when there is redundant data in the previous storage pool, comprises:
generating and executing a third access request corresponding to the first memory based on the redundant data and the query vector corresponding to index nodes in the previous storage pool;
calculating Euclidean distances between original vectors corresponding to the index nodes in the previous storage pool and the query vector, according to data obtained by the third access request corresponding to the first memory, and storing third access request results and corresponding index nodes in the result pool; and
outputting data in the result pool when the candidate pool does not include unreachable index nodes.

13. The storage medium according to claim 12, the index nodes in the candidate pool are arranged in order from near to far according to product quantization (PQ) distances from the query vector, wherein the PQ distances are distances between PQ compressed vectors corresponding to the index nodes and the query vector, and the PQ compressed vectors are obtained by compressing the original vectors through a product quantization (PQ) algorithm and wherein:
according to the query vector, generating and executing a first access request corresponding to a first memory corresponding to a first graph index and index nodes in a candidate pool comprises:
corresponding to first m unreachable index nodes in the candidate pool, generating and executing a first access request corresponding to the first memory according to the query vector, wherein m is a natural number greater than or equal to 1, and the first m unreachable index nodes are m unreachable index nodes which have the closest PQ distances to the query vector in all the index nodes in the candidate pool.

14. The storage medium according to claim 12, wherein obtaining and processing data corresponding to the first access request from the first memory when there is no redundant data in a previous storage pool, and storing first access request results in a result pool comprises,
obtaining data of original vectors corresponding to first m unreachable index nodes and adjacency tables of the first m unreachable index nodes from the first memory, wherein the first m unreachable index nodes are m unreachable index nodes which have the closest product quantization (PQ) distances to the query vector in all the index nodes in the candidate pool, the PQ distances are distances between PQ compressed vectors corresponding to the index nodes and the query vector;
calculating Euclidean distances between the original vectors corresponding to the first m unreachable index nodes and the query vector separately, and storing first access request results and corresponding index nodes in a result pool based on the vector data of the original vectors corresponding to the first m unreachable index nodes;

generating and executing a second access request corresponding to a second memory according to the query vector corresponding to index nodes in the adjacency tables of the first m unreachable index nodes;

calculating PQ distances between original vectors corresponding to the index nodes in the adjacency tables of the first m unreachable index nodes and the query vector separately, based on data obtained by the second access request corresponding to the second memory, and storing second access request results and corresponding index nodes in the candidate pool;

storing redundant data in the data acquired by the first access request corresponding to the first memory in the previous storage pool.

15. The storage medium of claim 12, the instructions, when executed on an electronic device, further cause the electronic device to:

generate and execute a fourth access request corresponding to the second memory according to the query vector, corresponding to index nodes in adjacency tables of the index nodes in the previous storage pool; and calculate product quantization (PQ) distances between original vectors corresponding to the index nodes in the adjacency tables of the index nodes in the previous storage pool and the query vector separately, based on data obtained by the fourth access request corresponding to the second memory, and store fourth access request results and corresponding index nodes in the candidate pool;

wherein the PQ distances are distances between PQ compressed vectors corresponding to the index nodes and the query vector.

16. The storage medium of claim 12, the method of obtaining the index nodes in the previous storage pool comprises:

calculating Euclidean distances between original vectors corresponding to the index nodes in the previous storage pool and the query vector separately based on the redundant data;

sorting the index nodes in the previous storage pool according to the Euclidean distances, and selecting first n index nodes; and calculating product quantization (PQ) distances between original vectors corresponding to index nodes in adjacency tables of the first n index nodes and the query vector separately according to PQ compressed vectors of the original vectors, wherein the PQ distances are distances between the PQ compressed vectors corresponding to the index nodes and the query vector;

storing the PQ distances and corresponding index nodes in the previous storage pool.

17. The storage medium according to claim 12, the first graph index is established by:

initializing fragments;

assigning index nodes to corresponding fragments according to the access frequency of neighbor index nodes; and synthesizing all the fragments into the first graph index.

18. The storage medium of claim 12, method of obtaining index nodes in the candidate pool comprises:

selecting a plurality of index nodes from all the index nodes in the first graph index as a training set;

performing retrieval training according to the training set and the first graph index, and recording access times of all the index nodes;

selecting p index nodes according to the access times of all the index nodes, and storing the p index nodes into a memory, wherein the p index nodes are p index nodes with the highest number of access times, and p is a natural number greater than or equal to 1;

establishing a memory navigation map;

retrieving a plurality of index nodes corresponding to original vectors whose distances are closest to the query vector according to the memory navigation map and the query vector; and storing the plurality of index nodes into the candidate pool.

19. The storage medium of claim 12, wherein reading speed of a first memory is greater than reading speed of a second memory.

* * * * *